United States Patent
Rahimi Malekshan et al.

(10) Patent No.: US 11,743,111 B2
(45) Date of Patent: Aug. 29, 2023

(54) NETWORK DEVICE AND A METHOD OF CONFIGURING THE NETWORK DEVICE THEREFOR

(71) Applicant: Siemens Canada Limited, Oakville (CA)

(72) Inventors: Kamal Rahimi Malekshan, Toronto (CA); Nathan Silver, Mississauga (CA); Michael Pustylnik, Toronto (CA); Igor Baglaenko, Toronto (CA)

(73) Assignee: SIEMENS CANADA LIMITED, Ontario (CA)

( * ) Notice: Subject to any disclaimer, the term of this patent is extended or adjusted under 35 U.S.C. 154(b) by 0 days.

(21) Appl. No.: 17/774,976

(22) PCT Filed: Nov. 11, 2019

(86) PCT No.: PCT/IB2019/001281
§ 371 (c)(1),
(2) Date: May 6, 2022

(87) PCT Pub. No.: WO2021/094803
PCT Pub. Date: May 20, 2021

(65) Prior Publication Data
US 2022/0417082 A1    Dec. 29, 2022

(51) Int. Cl.
*G06F 15/173* (2006.01)
*H04L 41/0663* (2022.01)
(Continued)

(52) U.S. Cl.
CPC ...... *H04L 41/0663* (2013.01); *H04L 41/0816* (2013.01); *H04L 41/0836* (2013.01); *H04L 41/12* (2013.01)

(58) Field of Classification Search
CPC ............ H04L 41/0663; H04L 41/0816; H04L 41/0836; H04L 41/12; H04L 2012/4026;
(Continued)

(56) References Cited

U.S. PATENT DOCUMENTS

2011/0116508 A1    5/2011    Kirrmann

FOREIGN PATENT DOCUMENTS

WO    2016097459    6/2016

OTHER PUBLICATIONS

Heine H. et al. "The High-Availability Seamless redundancy protocol (HSR): Robust fault-tolerant networking and loop prevention through duplicate discard"; Factory Communication Systems (WFCS), 2012 9th IEEE Inernational Workshop on, IEEE; pp. 213-222; 2012.
(Continued)

*Primary Examiner* — Karen C Tang
(74) *Attorney, Agent, or Firm* — Cozen O'Connor (57) ABSTRACT

Method and network device for providing redundancy in an industrial network includes a first port group connected to a first network segment of the industrial network, and includes a switch module that has a plurality of southbound ports, wherein at least one southbound port is connected to a corresponding end device, where each port group has a pair of redundant northbound ports connected to a link redundancy entity having two or more interlinked ports connectable to one or more south-bound ports of switch module based on network topology for enabling redundant links between end devices connected to the southbound ports and the first network segment.

12 Claims, 5 Drawing Sheets

(51) Int. Cl.
  *H04L 41/0816* (2022.01)
  *H04L 41/0823* (2022.01)
  *H04L 41/12* (2022.01)
  *G06F 16/16* (2019.01)
(58) Field of Classification Search
  CPC . H04L 12/40182; H04L 49/15; H04L 49/253; H04L 49/30; H04L 49/355; H04L 49/552; H04L 67/12; H04L 69/40; G05B 9/03
  USPC .......................................................... 709/224
  See application file for complete search history.

(56) References Cited

OTHER PUBLICATIONS

PCT International Search Report dated Sep. 18, 2020 based on PCT/IB2019/001281 filed Nov. 11, 2019.

NETWORK DEVICE AND A METHOD OF CONFIGURING THE NETWORK DEVICE THEREFOR

CROSS-REFERENCE TO RELATED APPLICATIONS

This is a U.S. national stage of application No. PCT/IB2019/001281 filed 11 Nov. 2019.

BACKGROUND OF THE INVENTION

1. Field of the Invention

The current disclosure relates to network devices and, more particularly, to network redundancy devices in industrial networks.

2. Description of the Related Art

The International Electrotechnical Commission (IEC) 62439-3 standard defines redundancy protocols for communication redundancy in industrial networks. The IEC 62439-3 standard defines two network redundancy technologies: Parallel Redundancy Protocol (PRP) and High Availability Seamless Ring (HSR). Although PRP and HSR target different network topologies, they are both based on the same idea and both provide the so called "seamless" network redundancy, which means zero packet loss and zero recovery time upon a single failure in the network. In PRP/HSR redundancy, each data packet transmitted towards the redundancy network segment is duplicated and two packets are transmitted over redundant network paths. At the receiver side, packets are examined and the second received packet is recognized as a duplicate and discarded.

Generally, in line with IEC 62439-3 standard, PRP and HSR redundancy is usually utilized for enabling communication redundancy in industrial networks. However, in case a particular device is unable to support PRP or HSR redundancy configuration, a Redbox may be used as a proxy device for enabling PRP or HSR functionality on the non PRP/HSR capable device. Redbox (also referred to as PRP/HSR redundancy box) is a networking device providing packet switch functionality and includes three ports: two redundant ports facing the redundant network segment, and an interlink port, facing the non-redundant network segment or end devices.

However, there are certain deficiencies with conventional Redboxes. Generally, in most configurations, Redboxes do not have provisions for being used in combination with an Institute of Electrical and Electronics Engineers (IEEE) 802.1Q/D switch. The standard expects a switch to be a stand-alone device. Accordingly, there are certain configurations that are not possible due to this limitation. Moreover, using a plurality of independent Redboxes may not be the cost effective. Accordingly, there is a need for a device that addresses the above concerns with regards to flexibility and costs.

SUMMARY OF THE INVENTION

In view of the foregoing, it is accordingly an object of the invention to provide a network device for providing redundancy in an industrial network.

This and other objects and advantages are achieved in accordance with the invention by a network device comprising one or more port groups and a switch module. The plurality of port groups comprises a first port group connected to a first network segment of the industrial network. The switch module comprises a plurality of southbound ports, wherein one or more southbound ports are connected to one or more corresponding end devices from a plurality of end devices. Each port group comprises a pair of redundant northbound ports connected to a link redundancy entity. Each link redundancy entity comprises two or more interlinked ports, each port from the two or more interlinked ports is connectable to one or more southbound ports of switch module based on one or more of user input and network topology associated with the industrial network for enabling redundancy between end devices connected to the southbound ports and the first network segment. Network topology is indicative of one or more connections and the end devices in the industrial network and redundancy configurations of the corresponding connections.

As mentioned above, in accordance with the current disclosure, the plurality of port groups including the link redundancy entities, and the switch device are connected in a single network device to provide a cost effective and flexible manner for enabling redundancies between end devices and network segments. By having the switch module and the link redundancy entities (with two or more ports) in the same device, connections between the ports of the link redundancy entities and the southbound ports of the switch module can be made in order to enable a plurality of redundancy configurations such as Virtual Doubly Attached Node (VDAN), High Availability Seamless Ring (HSR) quadbox, PRP-HSR, and/or PRP-PRP, using the network device. This allows for an advantageous, flexible manner and cost effective of providing redundancy in the industrial network while using a single network device that can act as one or more redboxes, and/or quadboxes.

In an example, the network device further comprises a configuration module for configuring a connection between a port from a link redundancy entity to one or more southbound ports based on one or more of user input and network topology. In another example, the configuration module comprises a user interface for receiving user input. The user input includes one or more identifiers of the one or more southbound ports to be connected to the port from the link redundancy entity and connection and redundancy configuration of the connection between the one or more southbound ports and the port from the link redundancy entity. Accordingly, via the configuration module, easy configuration of the network device is enabled. The user interface allows for easy and efficient configuration of the ports of the link redundancy entities and their connections. In a further example, each pair of redundant northbound ports is in a redundancy configuration based on one of Parallel Redundancy Protocol (PRP) and High availability Seamless Redundancy protocol (HSR).

In a further example, at least one end device connected to at least one southbound port is incapable of a redundancy configuration. In yet another example, devices of the first network segment are distinct from devices of the second network segment.

It is also an object of the invention to provide a method of configuring the network device, where the method comprises receiving network identifier of at least one end device, where the network identifier serves to establish connection with the network device and the at least one end device, where at least one end device is incapable of a redundancy configuration. The method additionally comprises receiving network configuration information, where the network configuration information is indicative of a network segment to be connected to the at least one end device, and where the network configuration information includes redundancy configuration information indicative of a redundancy configuration amongst the at least one end device and the network segment. The method further includes establishing connection between the end devices and the network segment in accordance with the network configuration information. Establishing the connection comprises establishing a first set of connections between the at least one end device and one or more southbound ports of the switch module based on the network identifier of the at least one end device, establishing a second set of connections between the network segment and two or more northbound ports of a first set of port groups based on the network configuration information, and establishing a third set of internal connections amongst pair of ports of the link redundancy entities of the first set of port groups connected to the network segment and the one or more southbound ports connected to at least one end device in accordance with the redundancy configuration information.

It is a further object of the invention to provide a non-transitory storage medium for configuring a network device. The non-transitory storage medium has machine-readable instructions stored therein which, when executed by one or more processors, cause the one or more processors to: receive network identifier of at least one end device, where the network identifier serves to establish connection with the network device and the at least one end device, where at least one end device is incapable of a redundancy configuration. The machine-readable instructions, when executed by one or more processors, additionally cause the one or more processors to: receive network configuration information, where network configuration information is indicative of a network segment to be connected to the at least one end device, and where network configuration information includes redundancy configuration information indicative of a redundancy configuration amongst the at least one end device and the network segment, and additionally cause the one or more processors to: establish connection between the end devices and the network segment in accordance with the network configuration information, where establishing the connection comprises establishing a first set of connections between the at least one end device and one or more southbound ports of the switch module based on the network identifier of the at least one end device, establishing a second set of connections between the network segment and two or more northbound ports of a first set of port groups based on the network configuration information, and establishing a third set of internal connections amongst pair of ports of the link redundancy entities of the first set of port groups connected to the network segment and the one or more southbound ports connected to at least one end device in accordance with the redundancy configuration information.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which.

DETAILED DESCRIPTION OF THE EXEMPLARY EMBODIMENTS

Figure 1:
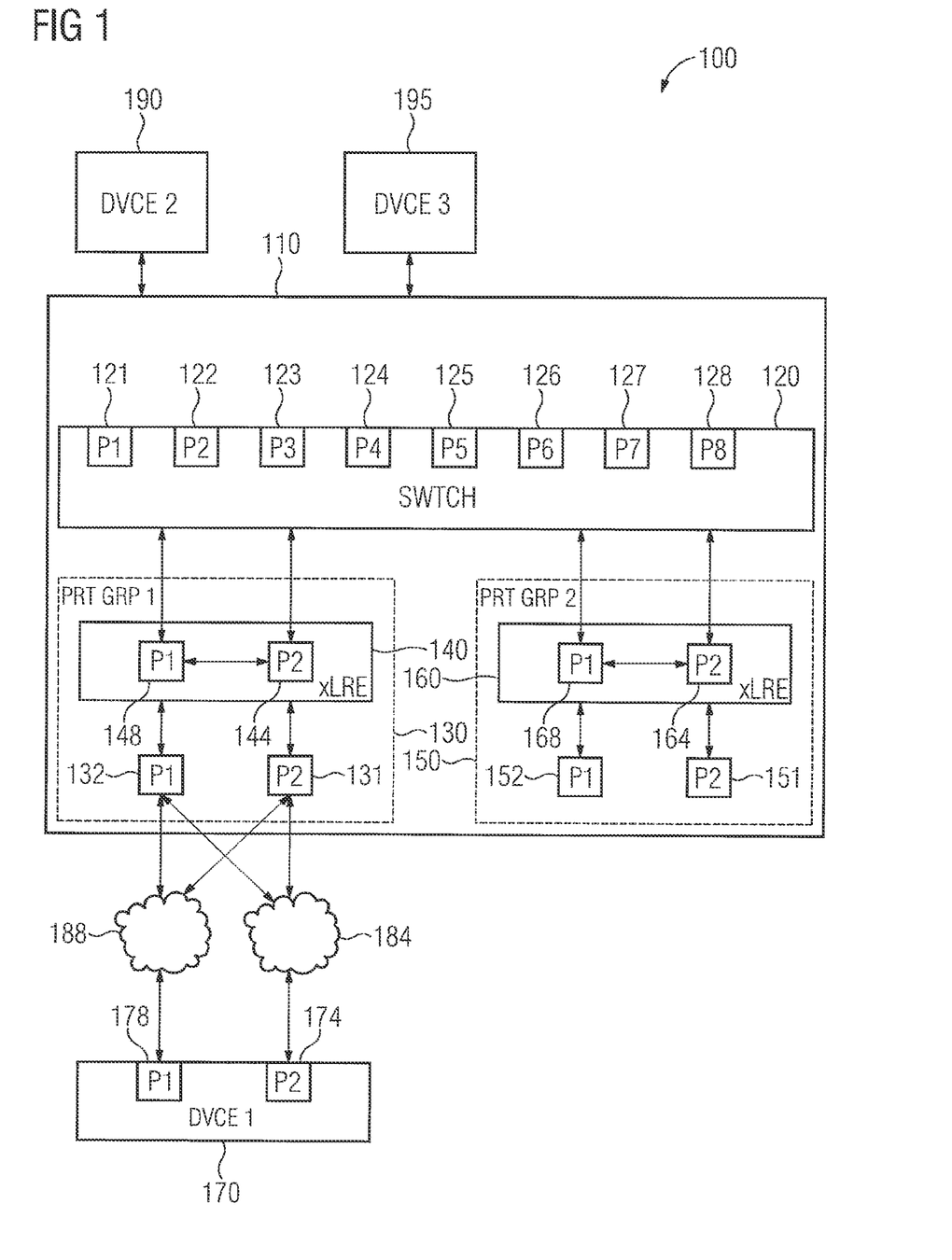
FIG. 1 illustrates an exemplary section of an exemplary industrial network comprising a network device connecting one or more end devices in accordance with the invention.

FIG. 1 illustrates an exemplary section 100 of an exemplary industrial network in an industrial facility. Industrial facility herein refers to any environment where one or more industrial processes such as manufacturing, refining, smelting, assembly of equipment may occur and includes without limitation process plants, oil refineries, and/or automobile factories. The industrial facility 100 may comprise a plurality of control devices connected to a plurality of field devices for monitoring and regulating one or more industrial processes in the industrial facility 100. The section 100 comprises a network device 110 for connecting a plurality of end devices (190, 195) with other network segments of the industrial network, while providing communication redundancy. Industrial network herein refers to any electronic data network and accordingly includes office campus networks, industrial automation networks, private radio networks, and any other high availability networks where redundancy is critical.

The network device 110 comprises one or more port groups (130, 150) and a switch module 120. The plurality of port groups comprises a first port group 130 connected to a first network segment (shown in FIG. 1 as device 170, sub-network segments 188 and 184) of the industrial network and a second port group 150 connected to a second network segment (not shown in FIG. 1) of the industrial network. In an example, devices of the first network segment are distinct from devices of the second network segment. The switch module 120 comprises a plurality of southbound ports (121 . . . 128), where one or more southbound ports (121 . . . 128) are connectable to one or more corresponding end devices from a plurality of end devices (190, 195). The southbound ports are for connecting end devices or non-redundant network segments with the network device 110. In an example, one or more end devices connected to southbound devices are incapable of supporting a redundancy protocol (also referred to as redundancy configuration) such as HSR, and/or PRP. Accordingly, the network device 110 acts as a proxy device for these end devices and enables communication redundancy in accordance with a redundancy protocol.

In an embodiment, the circuity associated with one or more port groups (130, 150) and the switch module (120) are housed in the same housing and are powered by a common first power source (not shown in the figures).

Each port group comprises a pair of redundant northbound ports connected to a link redundancy entity. For example, as shown in FIG. 1, port group 130 comprises a pair of redundant northbound ports 132 and 131 connected to link redundancy entity 140 and port group 150 comprises a pair of redundant northbound ports 152 and 151 connected to link redundancy entity 160.

The northbound ports are for connecting the network device 110 with network segments including devices capable of communicating in accordance with a redundancy protocol, such as HSR, and/or PRP. The northbound ports are accordingly in redundant pairs, where each port from the pair is capable of acting as a redundant communication channel for the other port of the pair. In an example, each pair of redundant northbound ports is in a redundancy configuration based on one of Parallel Redundancy Protocol (PRP) and High availability Seamless Redundancy protocol (HSR).

For example, as shown in FIG. 1, the northbound redundant pair of ports 131 and 132 are connected to a device 170 in accordance with PRP protocol. Accordingly, the device 170 comprises ports 174 and 178 over which a packet is duplicated and sent to the network device 110. The first duplicate packet via port 174 is transmitted via PRP sub network segment 184 and the second duplicate via port 178 is transmitted via PRP sub network segment 188. The first duplicate packet is then received by the northbound port 131 and the second duplicate packet is received by the northbound port 132. Accordingly, for packets received over northbound port 131, the packets received over northbound 132 are redundant copies. This applies for packet transmitted over northbound ports 131 and 132 to device 170.

Each link redundancy entity comprises two or more interlinked ports. Interlinked port herein refers to ports which may be used to connect of non-HSR/non-PRP nodes to HSR or PRP segments, or to provide interworking between HSR and a PRP network, or to combine two HSR segments via an HSR QuadBox configuration. Each port from the two or more interlinked ports is connectable to one or more southbound ports of switch module or to another interlinked port of another link redundancy entity. Additionally, an interconnection exists between all interlinked ports of a link redundancy entity, the interconnection may be configured to support various redundancy configuration. Additionally, in an embodiment, each interlinked port includes a mode which is indicative of the forwarding and routing configuration associated with the port. For example, as shown in FIG. 1, link redundancy entity 140 comprises interlinked ports 144 and 148. Similarly, link redundancy entity 160 comprises interlinked ports 164 and 168. The interlinked ports (144, 148, 164, 168) are connectable to the ports (121 . . . 128) of the switch module 120. The connections amongst the interlinked ports and the southbound ports are determined based on network topology and user input for enabling redundant links between end devices connected to the southbound ports and the one or more of the first network segment and the second network segment. Network topology is indicative of network and end devices in the industrial network and the connections amongst the devices.

In an example, the network device further comprises a configuration module for configuring a connection between a port from a link redundancy entity to one or more southbound ports based on one or more of user input and network topology. The configuration module comprises a user interface for receiving user input. The user input includes one or more identifiers of the one or more southbound ports to be connected to the port from the link redundancy entity and connection and redundancy configuration of the connection between the one or more southbound ports and the port from the link redundancy entity. These aspects are explained further in relation to FIG. 2.

Figure 2:
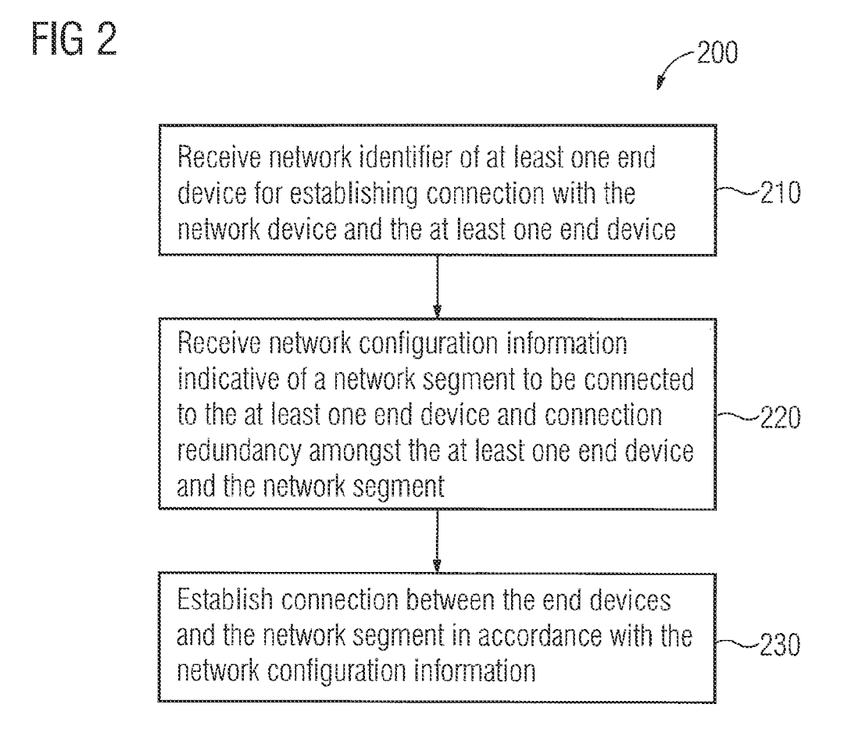
FIG. 2 illustrates a flowchart of an exemplary method for configuration of a network device in an industrial network in accordance with the invention.

FIG. 2 illustrates a method 200 for configuring the network device 110. In an example, the method 200 is realized by a configuration module. In an embodiment, the configuration module is a component of the network device 110. At step 210, the configuration module receives a network identifier of at least one end device. The network identifier serves to establish connection with the network device and the at least one end device. The at least one end device is incapable of a redundancy configuration.

At step 220, the configuration module receives network configuration information. Network configuration information is indicative of a network segment to be connected to the at least one end device. In an embodiment, the network configuration information is determined based on the network topology associated with the industrial network. For example, network topology indicates a network segment to be connected to the at least one end device and the redundancy configuration between the network segment and the at least one end device. Additionally, network configuration information includes redundancy configuration information indicative of a redundancy configuration amongst the at least one end device and the network segment. In an embodiment, the network configuration information is based on user input and network topology diagrams.

At step 230, the configuration module establishes connection between the at least one end device and the network segment in accordance with the network configuration information. Here, a connection is established between the at least one end device and at least one southbound port of the switch module based on the network identifier of the at least one end device. A second set of connections between the network segment and two or more northbound ports of a first set of port groups based on the network configuration information is then established. A third set of internal connections amongst pair of interlinked ports of the link redundancy entities of the first set of port groups connected to the network segment and the one or more southbound ports connected to at least one end device are subsequently established, in accordance with the redundancy configuration information. This is further explained in relation FIGS. 3 and 4.

Figure 3:
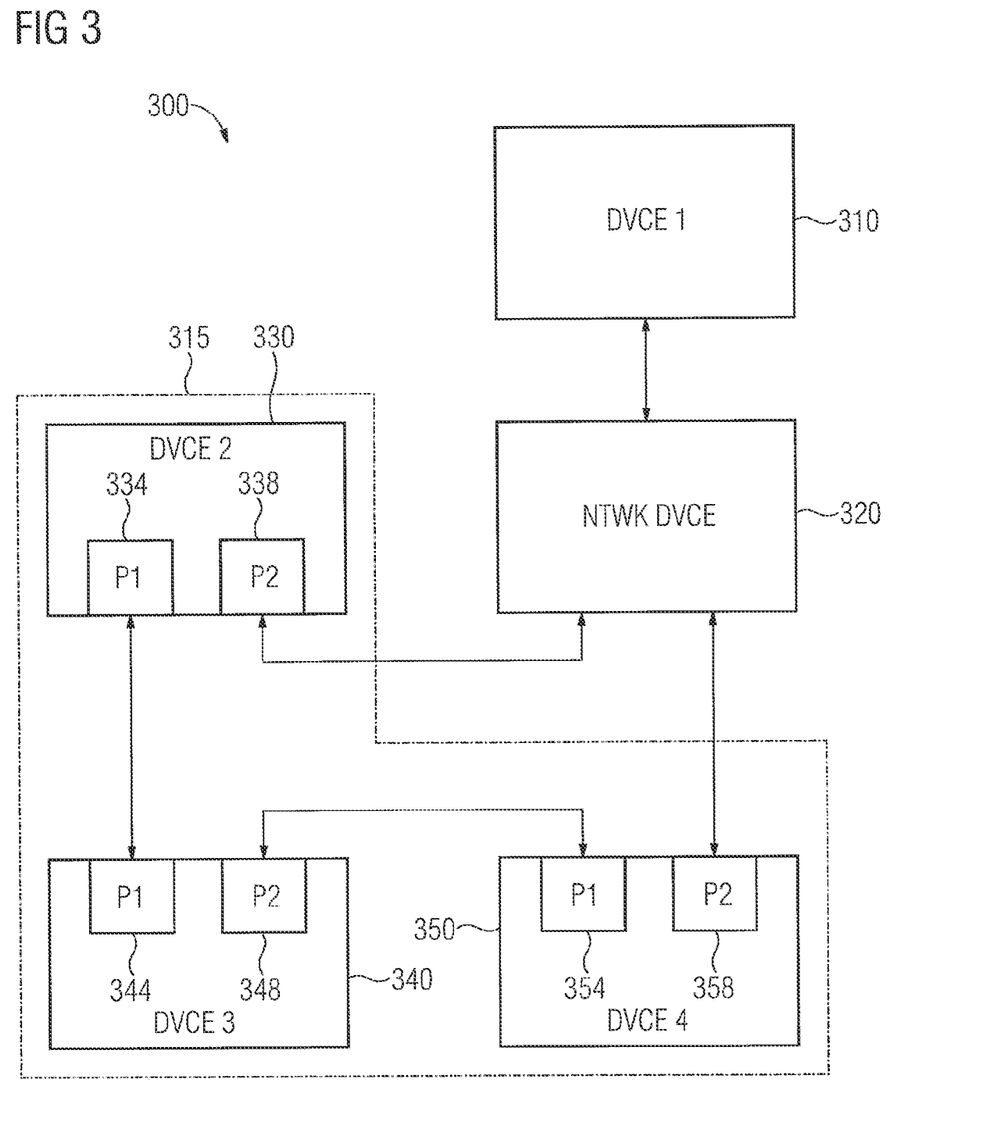
FIG. 3 illustrates an exemplary High Availability Seamless Ring (HSR) network configuration in an industrial network in accordance with the invention.

FIG. 3 illustrates an exemplary HSR network configuration 300 in an industrial network. End device 310 is to be connected to the HSR network segment 315 comprising devices 330, 340 and 350. However, end device 310 lacks the capability to support HSR configuration. Accordingly, the network device 320 is selected as a proxy device for enabling connection between the end device 310 and the network segment 315. Accordingly, based on the network identifier associated with the end device 310, a connection is established between a southbound port of the network device 320 and the end device 310.

Based on the network configuration information associated with the network segment 315, a second set of connections are then established between a pair of northbound redundant port of a first port group of the network device 320 and devices of the network segment 315 in an HSR redundancy configuration. Accordingly, a first northbound port from the pair of northbound ports is connected to port 358 of device 350 and second northbound port is connected to port 338 of device 330. The network segment 315 is connected to the northbound ports of the first port group of the network device 320. Accordingly, the interlinked ports of the link redundancy entity of the first port group are also connected to the network segment 315. An internal connection is then established between the southbound port connected to the end device 310 and the one of the interlinked ports of the link redundancy entity of the first port group to connect the end device 310 to the network segment 315.

In an embodiment, as mentioned above, ports of one link redundancy group may be connected with ports of one or more link redundancy groups. Accordingly, in an embodiment, a mode for each port of the link redundancy entity may be determined based on the redundancy configuration information. Mode of the port of the link redundancy entity refers to forwarding and routing configuration associated with the port. For example, based on the redundancy configuration information, a port of the link redundancy entity may be set in a PRP mode, HSR mode or a Virtual Doubly Attached Node (VDAN) mode. This is further illustrated with reference to FIG. 4.

Figure 4:
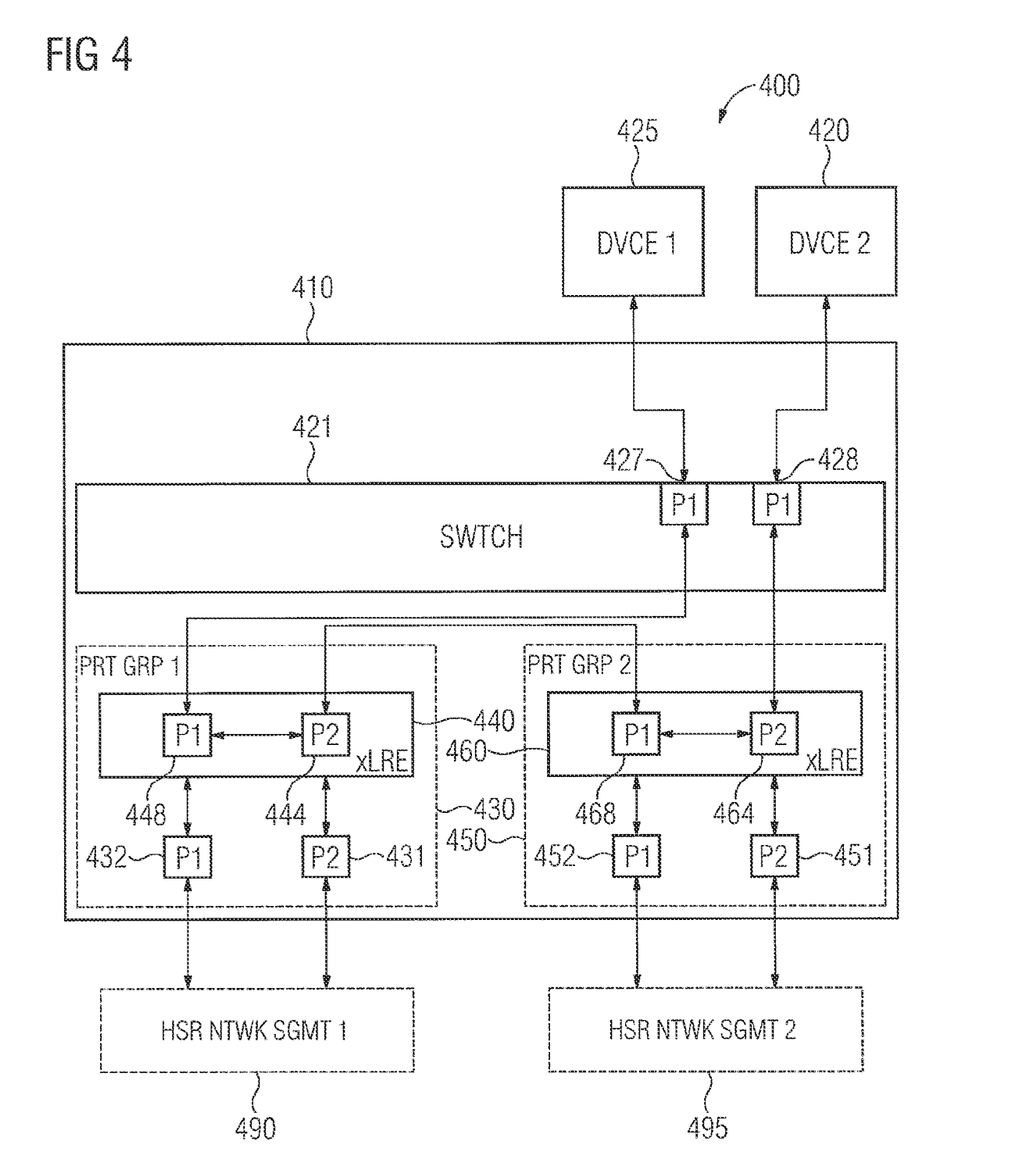
FIG. 4 illustrates an alternative exemplary network configuration in an industrial network in accordance with an embodiment of the invention.

FIG. 4 illustrates an example network configuration 400 in the industrial network. End devices 420 and 425 are to be connected to HSR network segment 495 and HSR network segment 490 respectively. Additionally, a HSR quadbox configuration in required to be realized in between the HSR network segments 490 and 495. However, end devices 420 and 425 do not have the capability to support HSR configuration. Accordingly, the network device 410 is selected as a proxy device for enabling connection between the end devices 420 and 425 and the network segments 495 and 490.

Based on the network identifier associated with the end device 420, a connection is accordingly established between a southbound port 428 of the network device 410 and the end device 420. Similarly, based on the network identifier associated with the end device 425, a connection is established between a southbound port 427 of the network device 410 and the end device 425.

Based on the network configuration information associated with the network segment 495, a second set of connections are then established between the HSR network segment 495 and pairs of northbound redundant ports (451 and 452) of a second port group 450 of the network device 410. The network segment 495 is connected to the northbound ports (451 and 452) of the second port group 450 of the network device 430. As a result, the interlinked ports (464, 468) of the link redundancy entity 460 of the second port group 450 are also connected to the network segment 495.

Similarly, based on the network configuration information associated with the network segment 490, a second set of connections are established between the HSR network segment 490 and pairs of northbound redundant ports (431 and 432) of a first port group 430 of the network device 410. Accordingly, the network segment 490 is connected to the northbound ports (431 and 432) of the first port group 430 of the network device 410. Consequently, the interlinked ports (444, 448) of the link redundancy entity 440 of the first port group 430 are also connected to the network segment 490.

Now, (third set of) internal connections are established amongst the southbound port connected to the end devices and the interlinked ports of the link redundancy entities of the port group. Accordingly, the mode of the interlinked port 448 is set to a VDAN mode. Interlinked port 448 of link redundancy entity 440 is then connected to southbound port 427. Accordingly, by this the end device 425 is connected to the network segment 490. Consequently, the mode of the interlinked port 464 is set to a VDAN mode. Interlinked port 464 of link redundancy entity 460 is then connected to southbound port 428. Accordingly, the end device 420 is connected to the network segment 495.

Additionally, in accordance with the redundancy configuration information, the modes of the interlinked ports 444 and 468 is set to HSR mode and thereby enabling an HSR quad box configuration. The interlinked port 444 of the link redundancy entity 440 is now connected to the interlinked port 468 of the link redundancy entity 460.

Accordingly, in an embodiment, one or more of the southbound ports may be connected to a non-redundant network segment for enabling redundancy configuration between a redundant network segment connected to two or more northbound ports. Redundancy configuration between the non-redundant network segment and the redundant network segment is enabled by connecting the interlinked ports of one or more link redundancy entities of the corresponding port groups.

In an embodiment, at least one port 144 of a link redundancy entity 140 of the first port group 130 is connectable to another port 168 of a second link redundancy entity 160 of the second port group 150 based on one or more of the user input and the network topology associated with the industrial network for enabling redundancy between the first network segment and the second network segment. Before the connection, the mode of the at least one port 144 and another port 168 may be set to one or HSR or PRP mode. As shown in the example described in FIG. 4, the ports of two link redundancy entity may be connected and configured to enable a HSR quadbox.

The present disclosure can take a form of a computer program product comprising program modules accessible from computer-usable or computer-readable medium storing program code for use by or in connection with one or more computers, processing units, or instruction execution system. For example, the configuration module may be realized across one or more devices.

Figure 5:
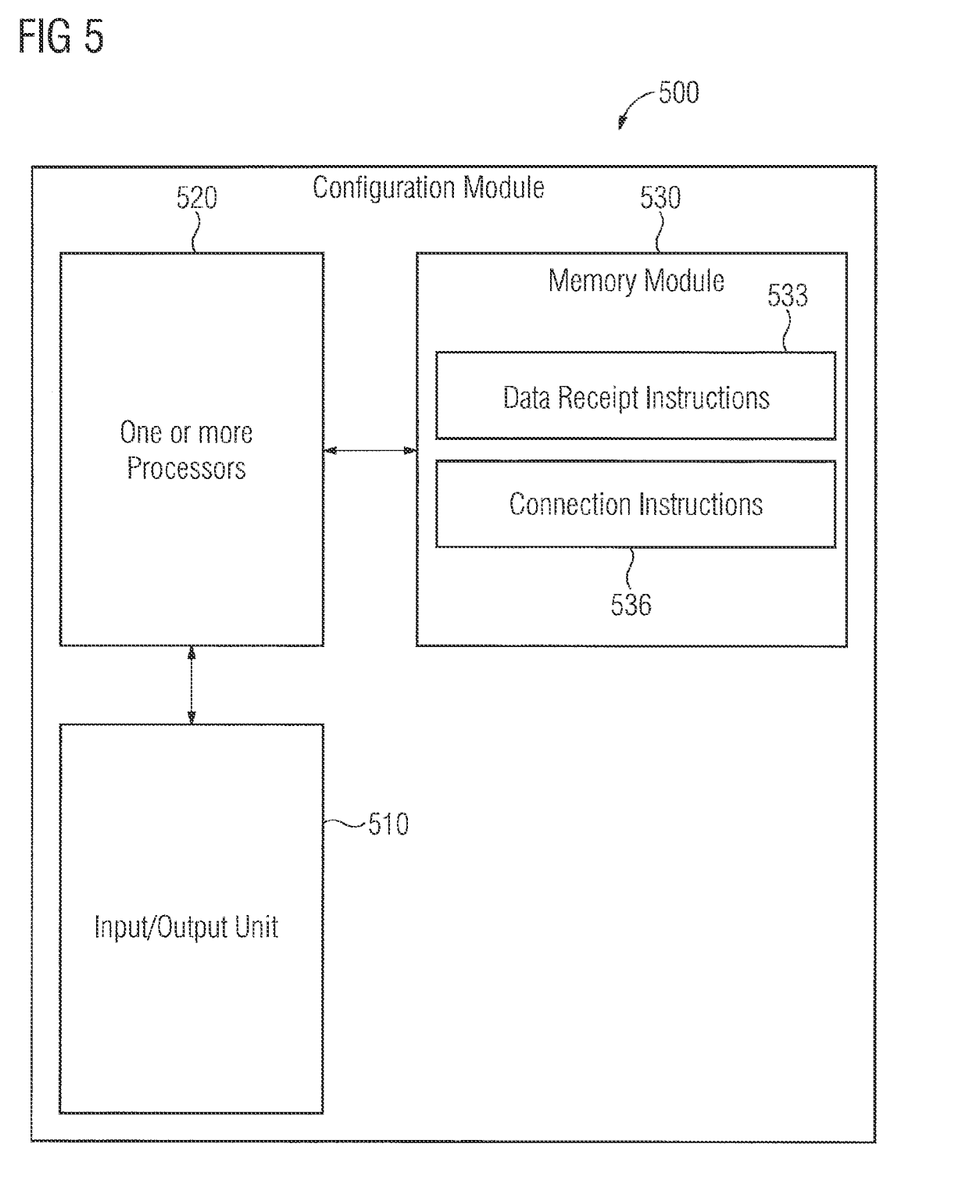
FIG. 5 illustrates an exemplary configuration module for configuring a network device in accordance with the invention.

Accordingly, the current disclosure describes a configuration module 500. The configuration module 500 includes an Input/Output (I/O) interface 510, one or more processors 520 and a non-transitory storage medium 530. The non-transitory storage medium 530 contains a plurality of instructions (533, 536 and 539) for configuring the network device 110 in the industrial network.

Upon execution of the data receipt instructions 533, the one or more processors 520 receive network identifier of at least one end device 190, via the I/O interface 510. As mentioned above, the network identifier serves to establish connection between the network device 110 and the at least one end device 190. The at least one end device 190 is incapable of a network redundancy configuration. The one or more processors then receives network configuration information associated with network topology of the industrial network via the I/O interface 510. Network configuration information is indicative of a network segment to be connected to the at least one end device 190. Additionally, network configuration information includes redundancy configuration information indicative of a redundancy configuration amongst the at least one end device and the network segment.

Upon execution of the connection instructions 536, the one or more processors 520 establishes connection between the at least one end device and the network segment in accordance with the network configuration information. In order to do this, the one or more processors 520 establishes a first connection between the at least one end device and a southbound port of the switch module based on the network identifier of the at least one end device. The one or more processors 520 then establishes a second set of connections between the network segment and two or more northbound ports of a first set of port groups based on the network configuration information. The one or more processors 520 then establishes a third connection between one of pair of interlinked ports of the link redundancy entities of the first set of port groups connected to the network segment and the southbound port connected to at least one end device in accordance with the redundancy configuration information.

While the current disclosure describes the configuration module 500 as an independent component or device, the configuration module 500 may be a software component and may be realized within the network device 110 or any other management device in the industrial network. For the purpose of this disclosure, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to a few industrial devices, a plurality of industrial devices may be utilized in the context of the current disclosure. While the present disclosure has been described in detail with reference to certain embodiments, it should be appreciated that the present disclosure is not limited to those embodiments.

In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A network device for providing redundancy in an industrial network, the network device comprising:

a. at least one port group comprising a first port group connected to a first network segment of the industrial network, each port group comprising a pair of northbound ports connected to a link redundancy entity; and    b. a switch module comprising a plurality of southbound ports at least one southbound ports being connected to corresponding end devices;

wherein each link redundancy entity of the plurality of port groups comprises a plurality of interlinked ports, each port of the plurality of interlinked ports is connectable to at least one southbound ports of the switch module based on at least one user input and network topology associated with the industrial network for enabling redundancy between end devices connected to the plurality of southbound ports and the first network segment.

2. The network device as claimed in claim 1, wherein at least one end device connected to at least one southbound port is redundantly configurable.

3. The network device as claimed in claim 1, wherein the network device comprises a configuration module for configuring a connection between a port of a link redundancy entity to the at least one southbound ports based on the at least one user input and network topology.

4. The network device as claimed in claim 1, wherein the plurality of port groups further comprises a second port group connected to a second network segment of the industrial network; and wherein at least one port of a link redundancy entity of the first port group is connectable to another port of a second link redundancy entity of the second port group based on the at least one the user input and the network topology associated with the industrial network for enabling redundancy between the first network segment and the second network segment.

5. The network device as claimed in claim 1, wherein at least one southbound port from the plurality of southbound ports is connected to one of a High availability Seamless Redundancy protocol (HSR) ring and a Parallel Redundancy Protocol (PRP) sub-network.

6. The network device as claimed in claim 1, wherein each pair of redundant northbound ports is in a redundancy configuration based on one of Parallel Redundancy Protocol (PRP) and High availability Seamless Redundancy protocol (HSR).

7. The network device as claimed in claim 1, wherein network topology is indicative of at least one connection and the end devices in the industrial network and redundancy configurations of the corresponding connections.

8. The network device as claimed in claim 1, wherein the at least one port group and the switch module are housed in a housing and are powered by a first power source.

9. The network device as claimed in claim 3, wherein the configuration module comprises an user interface for receiving user input, and wherein the at least one user input includes at least one identifier of the at least one southbound port to be connected to the port from the link redundancy entity, and redundancy configuration of the connection between the at least one southbound port and the port from the link redundancy entity.

10. The network device as claimed in claim 4, wherein devices of the first network segment are distinct from devices of the second network segment.

11. A method of configuring a network device comprising at least one port group and a switch module, each port group comprising a pair of redundant northbound ports connected to a link redundancy entity, and the switch module comprising a plurality of southbound ports, the method comprising:

a. receiving a network identifier of at least one end device, the network identifier serving to establish a connection between the network device and the at least one end device, and at least one end device being incapable of a redundancy configuration;
b. receiving network configuration information associated with network topology of the industrial network, the network configuration information being indicative of a network segment to be connected to the at least one end device, and the network configuration information including redundancy configuration information indicative of a redundancy configuration amongst the at least one end device and the network segment; and
c. establishing a connection between the at least one end device and the network segment in accordance with the network configuration information, said establishing the connection comprising
　i. establishing a first connection between the at least one end device and a southbound port of the switch module based on the network identifier of the at least one end device;
　ii. establishing a second set of connections between the network segment and a plurality of northbound ports of a first set of port groups based on the network configuration information; and
　iii. establishing a third connection between one of a pair of interlinked ports of the link redundancy entities of the first set of port groups connected to the network segment and the southbound port connected to at least one end device in accordance with the redundancy configuration information.

12. A non-transitory storage medium for configuring a network device comprising at least one port group and a switch module, each port group comprising a pair of redundant northbound ports, connected to a link redundancy entity, and the switch module comprising a plurality of southbound ports, the non-transitory storage medium having machine-readable instructions stored therein, which when executed by at least one processor, cause the at least one processor to:
a. receive a network identifier of at least one end device, the network identifier serving to establish a connection between the network device and the at least one end device, and at least one end device being incapable of being redundantly configured;
b. receive network configuration information associated with network topology of the industrial network, the network configuration information being indicative of a network segment to be connected to the at least one end device, and the network configuration information including redundancy configuration information indicative of a redundancy configuration amongst the at least one end device and the network segment; and
c. establish a connection between the at least one end device and the network segment in accordance with the network configuration information, said establishment of the connection comprising
　i. establishing a first connection between the at least one end device and a southbound port of the switch module based on the network identifier of the at least one end device;
　ii. establishing a second set of connections between the network segment and a plurality of northbound ports of a first set of port groups based on the network configuration information; and
　iii. establishing a third connection between one of a pair of interlinked ports of the link redundancy entities of the first set of port groups connected to the network segment and the southbound port connected to at least one end device in accordance with the redundancy configuration information.

\* \* \* \* \*